US011652807B2

(12) United States Patent
Rutherford-Jenkins et al.

(10) Patent No.: US 11,652,807 B2
(45) Date of Patent: *May 16, 2023

(54) DEVICE VALIDATION APPARATUS AND PROTOCOL FOR A GROUP-BASED COMMUNICATION SYSTEM

(71) Applicant: Salesforce, Inc., San Francisco, CA (US)

(72) Inventors: Chase Rutherford-Jenkins, San Francisco, CA (US); Graham Hicks, Berkeley, CA (US); Lorilyn McCue, Pacifica, CA (US); Alireza Takhtravanchi, San Francisco, CA (US); Samuel Wolfand, San Francisco, CA (US); Faisal Yaqub, New York, NY (US)

(73) Assignee: Salesforce, Inc., San Francisco, CA (US)

(*) Notice: Subject to any disclaimer, the term of this patent is extended or adjusted under 35 U.S.C. 154(b) by 127 days.

This patent is subject to a terminal disclaimer.

(21) Appl. No.: 17/128,990

(22) Filed: Dec. 21, 2020

(65) Prior Publication Data
US 2021/0112044 A1    Apr. 15, 2021

Related U.S. Application Data

(63) Continuation of application No. 15/839,705, filed on Dec. 12, 2017, now Pat. No. 10,880,286.

(51) Int. Cl.
*H04L 9/40* (2022.01)
*H04L 67/306* (2022.01)
(Continued)

(52) U.S. Cl.
CPC .......... *H04L 63/08* (2013.01); *H04L 12/1818* (2013.01); *H04L 51/42* (2022.05);
(Continued)

(58) Field of Classification Search
CPC ..... H04L 12/1818; H04L 63/08; H04L 51/22; H04L 63/104; H04L 67/306;
(Continued)

(56) References Cited

U.S. PATENT DOCUMENTS 10,055,714 B2 * 8/2018 Zhou ................. G06Q 20/36
10,200,377 B1    2/2019 Vazquez et al.
(Continued)

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

*Primary Examiner* — Benjamin A Kaplan
(74) *Attorney, Agent, or Firm* — Lee & Hayes, P.C.

(57) ABSTRACT

Provided is a computing device of a group based communication system configured to securely validate a client device associated with a group-based communication interface user. An example computing device is configured to identify a validating request transmitted from the client device. If a validating request is identified, the example computing device will transmit a temporary device code to the client device associated with the group-based communication interface user and an e-mail code to an e-mail address associated with a user profile associated with the group-based communication interface user. The example computing device also stores the codes transmitted. The example computing device then receives a confirmation exchange from the client device and determines whether the confirmation exchange satisfies client device validation parameters. If the confirmation exchange satisfies the client
(Continued)

device validation parameters, the example computing device will validate the client device by transmitting and storing a long lived device code.

20 Claims, 8 Drawing Sheets

(51) Int. Cl.
    *H04L 12/18*     (2006.01)
    *H04L 51/42*     (2022.01)
    *H04W 4/12*     (2009.01)
    *H04L 51/18*     (2022.01)

(52) U.S. Cl.
    CPC ............ *H04L 67/306* (2013.01); *H04L 51/18* (2013.01); *H04W 4/12* (2013.01)

(58) Field of Classification Search
    CPC ... H04L 63/0876; H04L 51/18; H04L 63/102; G06F 21/45; H04W 4/12
    USPC .......................................................... 726/4
    See application file for complete search history.

(56) References Cited

U.S. PATENT DOCUMENTS

| | | | |
|---|---|---|---|
| 10,305,882 B2 * | 5/2019 | Hinton | ............... H04L 63/0815 |
| 2018/0287982 A1 | 10/2018 | Draeger et al. | |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.
"Die, Email, Die! A Flickr Cofounder Aims to Cut US All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.
Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.
Internet Relay Chat, Wikipedia, [online][retrieved May 30, 2019], Retrieved from the Internet: <URL: https://en.wikipedia.org/wiki/Internet_Relay_Chat>. (dated May 28, 2019) 21 pages.
Mike Issac, "Slack, a Start-Up With an App to Foster Business Collaboration, is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 3 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", Fujitsu Sci. Tech. J., 36, 2, (Dec. 2000) pp. 154-161.
Office action for U.S. Appl. No. 15/839,705, dated Apr. 20, 2020, Rutherford-Jenkins, "Device Validation Apparatus and Protocol for a Group-Based Communication System", 20 pages.
Oikarinen, et. al. "Internet Relay Chat Protocol", Network Working Group, May 1993, 65 pages.
Oikarinen, J. & Reed, D., "Internet Relay Chat Protocol", Request for Comments: 1459, Network Working Group, [online][retrieved May 30, 2019], Retrieved from the Internet: <URL: https://www.rfc-editor.org/rfc/rfc1459.txt>. (dated May 1993) 57 pages.
Ernie Smith, "Picking up the Slack", Tedium, [online][retrieved May 9, 2019]. Retrieved from the Internet: <URL: https://tedium.co/2017/10/17/irc-vs-slack-chat-history/> (dated Oct. 17, 2017) 8 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

DEVICE VALIDATION APPARATUS AND PROTOCOL FOR A GROUP-BASED COMMUNICATION SYSTEM

PRIORITY

This application is a continuation of, and claims priority to, U.S. patent application Ser. No. 15/839,705, filed on Dec. 12, 2017, and entitled "DEVICE VALIDATION APPARATUS AND PROTOCOL FOR A GROUP-BASED COMMUNICATION SYSTEM", which is fully incorporated by reference herein.

BACKGROUND

Various messaging systems are available that allow users to have continuous device enabled conversations. Applicant has identified a number of deficiencies and problems associated with conventional messaging systems. Through applied effort, ingenuity, and innovation, many of these identified problems have been solved by developing solutions that are included in embodiments of the present invention, many examples of which are described in detail herein.

BRIEF SUMMARY

In general, embodiments of the present disclosure provided herein include method, apparatus, and computer program products for validating a client device associated with a group-based communication interface user following a validating request.

In some embodiments of the present disclosure, an apparatus may be provided for validating a client device associated with a group-based communication interface user following a validating request, the apparatus comprising at least a processor, and a memory associated with the processor having computer coded instructions therein, with the computer instructions configured to, when executed by the processor, cause the apparatus to receive user interaction data from the client device associated with the group-based communication interface user; parse the user interaction data to identify a validating request, wherein the validating request is associated with the client device; in circumstances where the validating request is identified among the user interaction data, transmit a temporary device code to the client device associated with the group-based communication interface user and an e-mail code to an e-mail address associated with a user profile associated with the group-based communication interface user, store the transmitted temporary device code and the e-mail code to memory, receive a confirmation exchange generated based on the temporary device code and the e-mail code from the client device, determine if the confirmation exchange satisfies client device validation parameters; and in circumstances where the confirmation exchange satisfies the client device validation parameters, transmit a long lived device code to the client device associated with the group-based communication interface user and storing the long lived device code under the user profile associated with the group-based communication interface user.

In some embodiments, the confirmation exchange comprises a copy of the temporary device code and the e-mail code. In another example embodiment, the client device validation parameters comprises a code identification parameter, and wherein determining if the confirmation exchange satisfies the client device validation parameters comprises determining whether the confirmation exchange comprises the temporary device code and e-mail code stored to memory.

In some embodiments, determining if the confirmation exchange satisfies client device validation parameters further comprises recording time stamp data associated with transmission of the temporary device code; and comparing a pre-determined time period to a difference between the time stamp data associated with the transmission of the temporary device code and a system time associated with receipt of the confirmation exchange. In another example embodiment, determining if the confirmation exchange satisfies client device validation parameters further comprises recording time stamp data associated with transmission of the e-mail code; and comparing a pre-determined time period to a difference between the time stamp data associated with the transmission of the e-mail code and a system time associated with receipt of the confirmation exchange.

In some embodiments, the validating request comprises a device ID of the client device.

In some embodiments, the computer instructions are configured to, when executed by the processor, further cause the apparatus to: receive user interaction data from the client device associated with the group-based communication interface user; parse the user interaction data to identify a group finding request and the long lived device code associated with the user profile; and in circumstances where the group finding request and the long lived device code is identified among the user interaction data, transmit group information associated with the user profile.

In some embodiments, the computer instructions are configured to, when executed by the processor, further cause the apparatus to: receive user interaction data from the client device associated with the group-based communication interface user; parse the user interaction data to identify a group modification request and the long lived device code associated with the user profile; and in circumstances where the group modification request and the long lived device code is identified among the user interaction data, modify group information associated with the user profile.

In some embodiments, the computer instructions are configured to, when executed by the processor, further cause the apparatus to: receive user interaction data from the client device associated with the group-based communication interface user; parse the user interaction data to identify a group modification request and, in circumstances where the group modification request is identified, parse the group modification request to identify the long lived device code associated with the user; and in circumstances where the long lived device code is identified in the group modification request, modify group information associated with the user profile.

In some embodiments, the validating request is automatically generated upon receiving a new user account registration indication.

In some embodiments, the apparatus is further configured to record time stamp data associated with transmission of the temporary device code; and delete the temporary device code stored after a pre-determined period of time is passed after the temporary device code is transmitted.

In some embodiments, the apparatus is further configured to record time stamp data associated with transmission of the e-mail code; and delete the e-mail code stored after a pre-determined period of time is passed after the e-mail code is transmitted.

In some embodiments, the apparatus is further configured to receive user interaction data from the client device associated with the group-based communication interface user; parse the user interaction data to identify a group finding request and the long lived device code associated with the user profile; and in circumstances where the group finding request and the long lived device code is identified among the user interaction data, generate a group summary indicator for display by the client device.

In another example embodiment, a method may be provided for apparatus may be provided for validating a client device associated with a group-based communication interface user following a validating request. The method may further include, receiving user interaction data from the client device associated with the group-based communication interface user; and parsing the user interaction data to identify a validating request, wherein the validating request is associated with the client device; in circumstances where the validating request is identified among the user interaction data, transmitting a temporary device code to the client device associated with the group-based communication interface user and an e-mail code to an e-mail address associated with a user profile associated with the group-based communication interface user, storing the transmitted temporary device code and the e-mail code to memory, receiving a confirmation exchange generated based on the temporary device code and the e-mail code from the client device, determining if the confirmation exchange satisfies client device validation parameters, and in circumstances where the confirmation exchange satisfies the client device validation parameters, transmitting a long lived device code to the client device associated with the group-based communication interface user and store the long lived device code under the user profile associated with the group-based communication interface user.

In some embodiments, the method further includes receiving user interaction data from the client device associated with the group-based communication interface user; parsing the user interaction data to identify a group finding request and the long lived device code associated with the user profile; and in circumstances where the group finding request and the long lived device code is identified among the user interaction data, transmitting group information associated with the user profile.

In some embodiments, the method further includes receiving user interaction data from the client device associated with the group-based communication interface user; parsing the user interaction data to identify a group modification request and the long lived device code associated with the user profile associated with the client device; and in circumstances where the group modification request and the long lived device code is identified among the user interaction data, modifying group information associated with the user profile.

In some embodiments, the method further includes receiving user interaction data from the client device associated with the group-based communication interface user; parsing the user interaction data to identify a group modification request and, in circumstances where the group modification request is identified, parsing the group modification request to identify the long lived device code associated with the user; and in circumstances where the long lived device code is identified in the group modification request, modifying group information associated with the user profile.

In some embodiments, the method further includes recording time stamp data associated with transmission of the temporary device code; and deleting the temporary device code stored after a pre-determined period of time is passed after the temporary device code is transmitted. In some embodiments, the method further includes recording time stamp data associated with transmission of the e-mail code; and deleting the e-mail code stored after a pre-determined period of time is passed after the e-mail code is transmitted.

In some embodiments, the method further includes receiving user interaction data from the client device; parsing the user interaction data to identify a group finding request and a long lived device code associated with the user profile; and in circumstances where the group finding request and the long lived device code is identified among the user interaction data, generating a group summary indicator for display by the client device.

BRIEF DESCRIPTION OF FIGURES

Reference will now be made to the accompanying drawings, which are not necessarily drawn to scale, and wherein.

DETAILED DESCRIPTION

Figure 1:
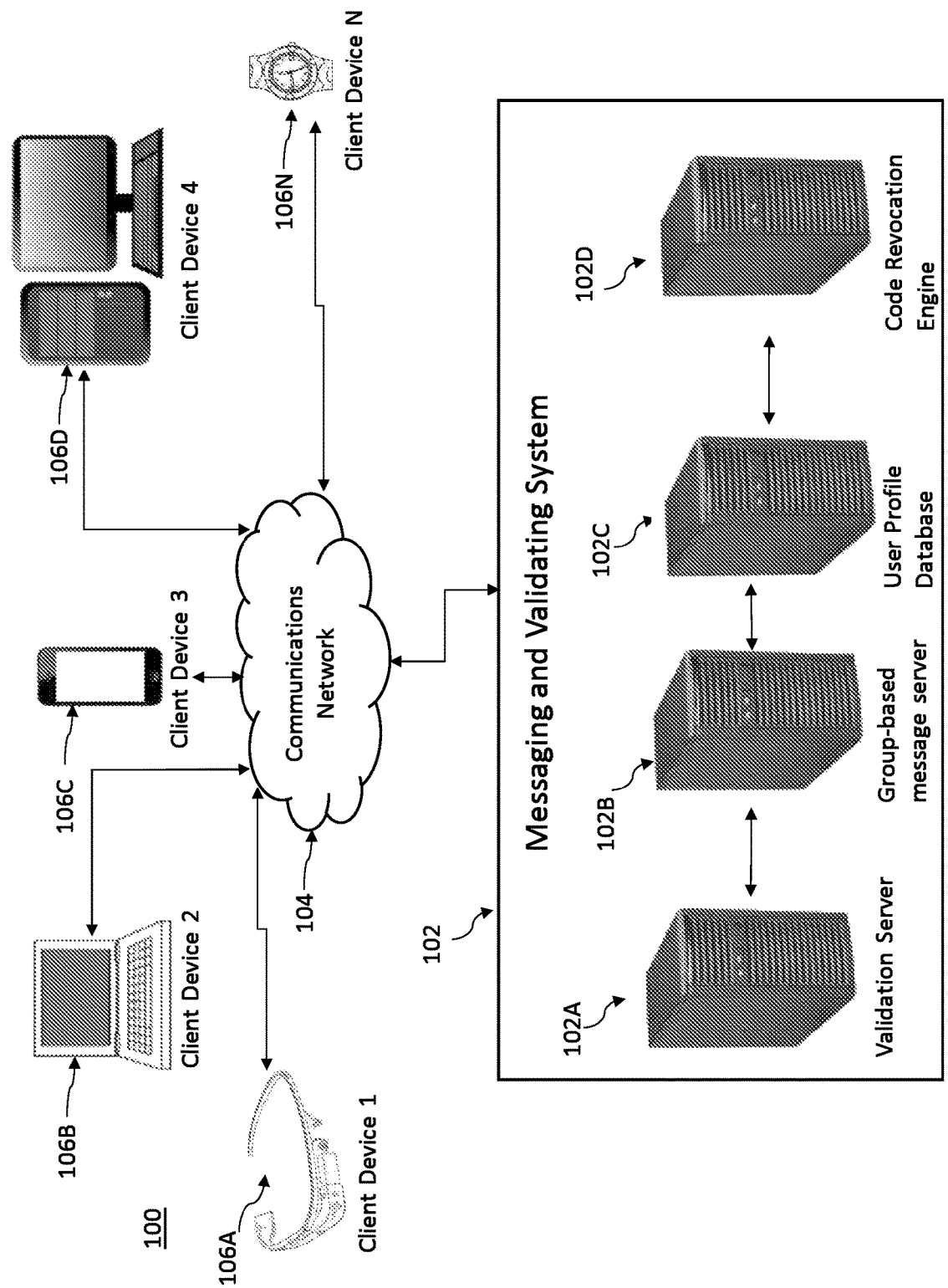
FIG. 1 illustrates a group-based communication system structured in accordance with some embodiments discussed herein.

Some embodiments of the present invention will now be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Terms

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "user" should be understood to refer to an individual, group of individuals, business, organization, and the like; the users referred to herein are accessing a group-based communication system (defined below) using client devices.

The term "client device" refers to a network connected machine having computer hardware and/or software that is configured to access a service made available within a group-based communication system. Client devices include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. A group may be assigned a name, a group ID and a URL unique to the group. Group information that includes the name, the group ID, the URL, and the common access credentials may be stored in a server and/or database in a group based communication system. A group's group information is associated with a user profile if the user associated with the user profile is a group member of the group.

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of a topic or key words associated with the topic within such messages).

The term "group-based communication system" refers to a communications software platform and associated hardware that is configured to support and maintain a plurality of group-based communication interfaces and all associated functionality. Group-based communication system users are organized into organization groups (e.g., employees of different companies may be separate organization groups) and each group interacts with the system via a respective group-based communication interface. For example, the group-based communication system might support, among others, a Slack Corporation group-based communication interface and an ACME Corporation group-based communication interface. Example group-based communication systems comprise messaging and validating system and client devices. The messaging and validating system comprise, among other components, a group-based message server, a validation server, a user account database, a code revocation engine, and the like.

The term "group-based communication interface" refers to a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface includes a plurality of group-based communication channels (e.g., a marketing channel, sales channel, accounting channel, etc.), which are defined below.

The term "group-based communication channel" refers to a virtual communications environment or feed that is configured to display group-based messages posted by channel members (e.g., validated users accessing the environment using client devices) that are viewable only to channel members. The format of the group-based communication channel may appear differently to different users of the group-based communication channel; however, the content of the group-based communication channel (i.e., group-based messages) will be displayed to each member of the group-based communication channel. For instance, a common set of group-based messages will be displayed to each member of the respective group-based communication channel such that the content of the group-based communication channel (i.e., group-based messages) will not vary per member of the group-based communication channel.

The terms "group-based message" and "message" refer to any electronically generated digital content object provided by a user using a client device that is configured for display within a group-based communication channel. Message communications may include any text, image, video file, audio file, streaming content, or combination thereof provided by a user (using a client device). For instance, the user may provide a group-based message that includes text as well as an image and a video file within the group-based message as message contents. In such a case, the text, image, and video file would comprise the group-based message or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

The term "user interaction data" refers to data generated based on user interaction with one or more of the client devices. For example, user interaction data may be generated based on group-based messages, inputs, uploads, or other user engagement of a group-based communication interface. In some embodiments, the user interaction data may be generated based on user interaction with an input/output module of a client device following a user clicking on a "Confirm sign-up" button displayed on a group-based communication interface. In another example, the user interaction data may be generated based on user interaction with an input/output module of a client device following a user clicking on a "Find All Teams" button displayed on a group-based communication interface.

The terms "user profile," "user account," and "user account details" refer to information associated with a user, including, for example, a user identifier, one or more group-based communication channel identifiers associated with group-based communication channels that the user has been granted access to, an indication as to whether the user is an owner of any group-based communication channels, an indication as to whether the user has any group-based communication channel restrictions, an indication as to whether the user has any validated client device, one or more device codes associated with the user's client devices, information regarding the user's validated client device such as device identifier, a plurality of messages, a plurality of emojis, a plurality of conversations, a plurality of conversation topics, an avatar, an email address, a real name (e.g., John Doe), a username (e.g., jdoe), a password, a time zone, a status, and the like. The user profile can include a subset designation of user credentials, such as, for example, login information for the user including the user's username and password. For example, and without limitation, a user identifier may include a unique graphical identifier (e.g., an avatar), an IP address, a MAC address, and the like.

The term "validating request" refers to a request transmitted from a client device to a messaging and validating system in a group-based communication system for the purpose of initiating a validation process involving a long lived device code. The validating request comprises an e-mail address. The messaging and validating system will store the e-mail address under user profile associated with the user. A client device is able to make a series of different requests such as group finding request, group-modification request, or other requests related to the group-based communication interface, channel, and users. The requests transmitted from validated client devices and non-validated client devices are processed based on different standards. The standard or protocol for processing requests transmitted from validated client devices contains less security measures compared to the standard of processing requests transmitted from non-validated client devices. For example, when a validated client device requests group information associated with a user profile from a messaging and validating system of the group-based communication system (i.e., group finding request), a validation server of the messaging and validating system may directly send group information associated with the user profile to the client device. Alternatively, if the client device is not validated, the validation server may request a password associated with the user profile or user interaction data indicating that the user has clicked on an authentication link embedded in an email sent to an e-mail address associated with a user profile. In some embodiments, when a client device detects that a user signs up to use a group-based communication system, a validating request is automatically generated and transmitted by the user's client device. In some embodiments, the validating request further comprises a device ID of the client device sending the validating request.

The term "temporary device code" refers to a code generated for the purpose of obtaining a long lived device code when validating a client device. The temporary device code is transmitted to a client device by a messaging and validating system of the group-based communication system upon receiving a validating request. For example, a validation server may pseudo randomly generate a temporary device code upon identification of a validating request. The validation server stores the temporary device code to memory and also transmit the temporary device code to a client device. The client device then stores the transmitted temporary device code.

In some embodiments, the client device generates a "confirmation exchange" based on the temporary device code and other data, such as an e-mail code. The term "confirmation exchange" is defined below. The client device then transmits the confirmation exchange to the validation server.

In some embodiments, the temporary device code expires after a pre-defined period of time (referred to as "temporary device code expiration period"). The validation server may record time stamp data and store the temporary device code when the temporary device code is transmitted. After the temporary device code expiration period has lapsed, the server deletes the stored temporary device code or marks the stored temporary device code as invalid. Therefore, if client device data comprising the expired temporary device code is received by the messaging and validating system, the messaging and validating system will recognize the temporary device code as expired. In some embodiments, the validation server will store the temporary device code as associated with an e-mail code and the validation server will only recognize any temporary device code as valid if the temporary device code is sent back with the e-mail code associated with the temporary device code.

The term "long lived device code" refers to a code generated by a messaging and validating system of the group-based communication system that is transmitted to a client device upon receiving a confirmation exchange for the purpose of validating a client device. For example, a validation server may pseudo randomly generate a long lived device code upon identifying that a confirmation exchange satisfies client device validation parameters. The validation server stores the long lived device code to memory and then transmit the long lived device code to a client device. The client device then stores the transmitted long lived device code. A client device is validated if a long lived device code is stored on the client device and the same long lived device code is stored on the validation server and not marked as invalid. In some embodiments, the validation server stores elements of the long lived device code that can be hashed to identify a long lived device code instead of storing the long lived device code itself.

The term "e-mail code" refers to a code generated by a messaging and validating system for the purpose of validating a client device. The e-mail code is transmitted by the messaging and validating system, for example by a validation server, to an e-mail address stored in association with a user profile. In one embodiment, a validation server may pseudo randomly generate an e-mail code upon receiving a validating request from a previously non-validated client device. The validation server stores the e-mail code to memory and then transmit the e-mail code to an e-mail address stored in association with the user profile. For example, an e-mail code may be embedded in a "confirm E-mail" button that is rendered with the graphic user interface of an e-mail application. In various embodiments, transmission of the e-mail code occurs without any further user involvement or notification (i.e., no user facing acknowledgement of the e-mail code transmission need be provided). Validation server may embed the e-mail code in a universal link, deep link or app link in the e-mail. In some embodiments, validation server determines which link to use by analyzing a device ID previously transmitted from client device.

In some embodiments, the e-mail code expires after a pre-defined period of time (referred to as "e-mail code expiration period"). The validation server may record time stamp data and store the e-mail code when the e-mail code is transmitted. After the e-mail code expiration period has lapsed, the server deletes the stored temporary device code or marks the stored temporary device code as invalid. In some embodiments, the client device generates a confirmation exchange based on the e-mail temporary device code and other data, such as a temporary device code, and transmit the confirmation exchange to the validation server. In some embodiments, the validation server will store the e-mail code as associated with a temporary device code and the validation server will only recognize any data comprising the e-mail code as valid if the e-mail code is sent back with the temporary device code associated with the e-mail code.

The term "confirmation exchange" refers to data generated by a client device and sent to messaging and validating system such as a validation server during the course of validating a client device after receiving the temporary device code from the validation server. The confirmation exchange comprises data generated based on user interaction such as data generated based on embedded e-mail code and data generated based on a temporary device code upon user interaction data generated based on a user hitting a "Confirm E-mail" button. In some embodiments, a confirmation exchange is generated by hashing or otherwise combining an e-mail code and a temporary device code. As an example, a confirmation exchange comprising the copies of the e-mail code and the temporary code is set forth below:

{
"temp_device_code": "a8b6r7a5c3a0d9abra",
"email_code": "igotthisfromauniversallinkinanemail"
}

The term "group finding request" refers to a request originated from a client device to access information related to groups associated with a particular user profile. The client device may be validated or non-validated. In some embodiments, the group finding request is generated on the client device based on detection of user interaction data, such as user interaction data generated in response to a user clicking on "Find All Teams" button in a group-based communication interface. In some embodiments, the group finding request may comprise a long lived device code if the group-modification request is originated from a validated client device. The validation server identifies whether a group finding request is originated from a validated client device or not by identifying a long lived code in the group finding request. In some embodiments, if the client device that sends the group finding request is a validated client device, a server such as a validation server in the group-based communication system sends group information associated with the user profile associated with the user without any additional security check.

In other embodiments, if the client device that sends the group finding request is not a validated client device, a validation server of the group-based communication system sends group information associated with the user profile associated with the user only after an additional security check is performed. For example, the additional security check may take the form of requesting the client device to send data representing the user's password or data embedded in another e-mail sent to the user's e-mail address. Further, a validation server may instruct the client device to initiate a validating request. Alternatively, before a non-validated client device sends a group finding request, the client device search for a long lived device code stored locally. If long lived device code is not found, the client device initiates a validating request and display corresponding messages on the client device accordingly. For example, the corresponding message may take the form of "You have to validate your device to see all your teams!" In some embodiments, a group finding request is automatically initiated by a client device when certain user interaction is identified. For example, a client device may automatically initiate a group finding request when the user signs into the group-based communication interface.

The term "group modification request" refers to a request to modify group information associated with a user profile associated with a particular user originated from a client device or a request to create a new group. The client device sending the group modification request may be a validated or a non-validated client device. The modification may take the form of adding a user as the leader of the group, modifying the leader of the group, creating a new group, and the like. In some embodiments, the group modification request may comprise a long lived device code if the group-modification request is originated from a validated client device. The validation server may identify whether a group-modification request is originated from a validated client device by identifying a long lived code in the group-based modification request.

In some embodiments, if the client device that sends the group modification request is a validated client device, a validation server of the group-based communication system modifies group information associated with the user profile associated with the user without any additional security check. In other embodiments, if the client device that sends the group modification request is not a validated client device, a validation server of the group-based communication system modifies group information associated with the user profile associated with the user only after additional security check is performed. For example, the additional security check takes the form of requesting the client device to send data representing the user's password or data embedded in another e-mail sent to the user's e-mail address.

The term "client device validation parameters" refers to a set of routines, characteristics, functions, values, rules, or algorithms that the validation server uses to determine whether a client device should be validated. For example, client device validation parameters may comprise a response time threshold (i.e., a pre-determined time period deemed acceptable between a temporary device code and/or e-mail code transmission time stamp and a confirmation exchange received time stamp), and code identification parameters (set to "Valid" if the previously transmitted temporary device code and e-mail code associated with the temporary device code or an identification of the previously transmitted temporary device code and e-mail code associated with the temporary device code are present in the confirmation exchange).

Overview

Various embodiments of the disclosure are directed to validating a client device that is configured to interact with a group-based communication system.

A user of a group-based communication system may use a client device to request group information associated with the user. A user may also use a client device to request modification of group information (e.g., creating a new group, add or delete members of existing groups, and the like). Because these requests deal with private or sensitive user information (e.g., personally identifiable information), security is a large concern. Multiple security measures are in place to protect private user information. For example, a user may be required to enter the user's e-mail address and password when requesting group information associated with the user. Additionally or alternatively, a user may be required to enter confirmation information retrieved or accessed from an email sent to the user's e-mail address. In some circumstances, applications may require two factor authentication before a user is provided access to private user information.

Unfortunately, however, these traditional security measures are often inefficient and do not always produce a positive user experience. If the user uses the same client device over and over again, the user will have to enter password and/or confirmation information that was sent to the user's e-mail address over and over again. Alternatively, the user may be forced to leverage other forms of two factor authentication that are similarly inefficient.

Various embodiments of the present invention are configured to efficiently protect user information by securely validating a client device. When a new user signs up to use a group-based communication system or when an existing user returns to use a group-based communication system, if a client device is not yet validated by the group-based communication system, the system requires the client device to proceed through a validation protocol as described herein to efficiently safeguard user account information and other personally identifiable user data. As a result, each time the user uses the same client device to use the group-based communication system, the user is not required to traverse the long-form traditional security measures when requesting group information or modifying group information. Further, system resources such as network bandwidth, memory, processing power, etc., may be substantially freed from undue operations associated with returning users being forced to cycle through the long form security procedures.

As will be discussed in greater detail below, various embodiments of the present disclosure are directed to validating a client device in a group-based communication system following a validating request transmitted by the client device. A validation server in a messaging and validating system receives user interaction data from the client device associated with the group-based communication interface user. The validation server then parses the user interaction data to identify a validating request. When a validating request is identified among the user interaction data, the validation server will transmit a temporary device code to the client device associated with the group-based communication interface user and an e-mail code to an e-mail address associated with a user profile associated with the group-based communication interface user; store the transmitted temporary device code and the e-mail code to memory; receive a confirmation exchange generated based on the temporary device code and the e-mail code from the client device; determine if the confirmation exchange satisfies client device validation parameters; then transmit a long lived device code to the client device associated with the group-based communication interface user and store the long lived device code under the user profile associated with the group-based communication interface user.

Exemplary Architecture

FIG. 1 shows system 100 including an example network architecture comprising one or more devices and sub-systems that are configured to implement some embodiments discussed herein. For example, system 100 includes messaging and validating system 102, which can include, for example, validation server 102A, group-based message server 102B, user profile database 102C, code revocation engine 102D, among other things (not shown). Each one of the servers and databases in messaging and validating system 102 may include any suitable network server and/or other type of processing device. Each of 102A-102D are connected with each other (i.e., configured in electronic communication). In some embodiments, each of 102A-102D may be implemented together as one server to perform the functionalities of each of 102A-102D. In some embodiments, the validation server 102A determines and transmits commands and instructions for validating client devices 106A-106N and processing requests such as validating requests, group finding requests, and group modification requests from client devices 106A-106N.

Messaging and validating system 102 is configured to communicate with one or more client devices 106A-106N via network 104. In this regard, network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 104 may include a cellular telephone, an 802.11, 802.16, 802.20, and/or WiMax network. Further, the network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication interface. In some embodiments, the protocol is a custom protocol of JSON objects sent via a Websocket channel.

Client devices 106A-106N and/or messaging and validating system 102 may each be implemented as a personal computer and/or other networked device, such as a cellular phone, tablet computer, mobile device, terminal, or server, which may be used for any suitable purpose in addition to presenting the group-based communication interface. The depiction in FIG. 1 of "N" members is merely for illustration purposes. Any number of members may be included in the system 100 so long as the members have the proper credentials for accessing a selected group-based communication interface. In one embodiment, the client devices 106A-106N may be configured to display a graphic user interface on a display of the client device for viewing, creating, editing, and/or otherwise interacting with at least one group-based communication channel of the group-based communication interface, which may be hosted, maintained, and supported by the messaging and validating system 102.

In some embodiments, user interaction data (perhaps generated based on a group-based message) may be sent from a client device 106A-106N to messaging and validating system 102 or a server in messaging and validating system 102, such as validation server 102A. In various implementations, the user interaction data is sent to the messaging and validating system 102 over network 104 directly by a client device 106A-106N and, in alternate embodiment, the user interaction data may be sent to the messaging and validating system 102 through some intermediary device or component (not shown).

In one example, a group-based message transmission comprising a group-based message may be sent from client device 106A-106N to messaging and validating system 102. In some embodiments, client device 106A-106N send the group-based message transmission to the messaging and validating system 102 over network 104. In some other embodiments, client device 106A-106N send the group-based message to the messaging and validating system 102 via an intermediary. User interaction data generated based on the group-based message may also be sent from client device 106A-106N to messaging and validating system 102 along with the group-based message. Alternatively, messaging and validating system 102 can also generate user interaction data based on the group-based message received. The user interaction data and/or group-based message transmission is then determined and provided by group-based message server 102B to the validation server 102A and received by communication module 212 at validation server 102A.

In another example, the group-based message received from a client device is directly received by input/output module 210 at validation server 102A. In one implementation, the user interaction data received by validation server 102A includes data generated based on group-based message. The user interaction data received by validation server 102A may further include other data related to a group-based message. Exemplary data related to group-based message are: a group-based message identifier, sending user identifier, a group identifier, a group-based communication channel identifier, group-based message contents (e.g., text, emojis, images, links), attachments (e.g., files), group-based message hierarchy data (e.g., the group-based message may be a reply to another group-based message), third party metadata, and/or the like. After parsing the user interaction data via interaction parsing module 216, validation server 102A may identify a validating request. Alternatively or additionally, user interaction data received by validation server 102A includes data generated based on user interactions that are not directly related to a group-based message, such as signing into a group-based communication interface, clicking buttons inside the group-based communication interface, and the like. In some embodiments, the data generated based on user interactions that are not directly related to a group-based message may be a validating request, a group finding request, or a group modification request.

In one embodiment, the client device 106A-106N provides the following example group-based message, substantially in the form of a (Secure) Hypertext Transfer Protocol ("HTTP(S)") POST group-based message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_ 1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further group-based messages will include only on to save
            //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name> </app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone: CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
```

```
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S Build/IMM76D)
AppleWebKit/534.30 (KHTML, like Gecko) Version/4.0 Mobile Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3) AppleWebKit/537.75.14
(KHTML, like Gecko) Version/7.0.3 Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <group-based message>
        <group-based message_identifier>ID_group-based message_10</group-based
message_identifier>
        <team_identifier>ID_team_1</team_identifier>
        <channel_identifier>ID_channel_1</channel_identifier>
        <contents> /ACME_docs_all</contents>
        <attachments></attachments>
    </group-based message>
</auth_request>
```

The messaging and validating system 102 then, using group-based message server 102B, creates a stored group-based message based upon the received group-based message to facilitate group-based message indexing and storage in a group-based communication repository. In one implementation, the stored group-based message transmission may include data such as a group-based message identifier, a group identifier, a group-based communication channel identifier, a sending user identifier, topics, responses, group-based message contents, attachments, group-based message hierarchy data, third party metadata, conversation primitive data, and/or the like. For example, the messaging and validating system 102, group-based message server 102B, may provide the following example group-based message stored on the database, substantially in the form of a HTTP(S) POST group-based message including XML-formatted data, as provided below:

```
POST /storage_group-based message.php HTTP/1.1
Host: www.server.com
Content-Type: Application/XML
Content-Length: 667
<?XML version = "1.0" encoding = "UTF-8"?>
<storage_group-based message>
    <group-based message_identifier>ID_group-based message_10</group-based message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>inventions</topic>
        <topic>technical</topic>
        <topic>documents</topic>
    </topics>
    <responses>
        <response>liked by ID_user_2</response>
        <response>starred by ID_user_3</response>
    </responses>
    <contents> Here's the link to the shared document: https://doc.ACME.com/12345.</contents>
    <attachments></attachments>
    <conversation_primitive>
```

```
    conversation includes group-based messages: ID_group-based message_8, ID_group-based
message_9, ID_group-based message_10,
        ID_group-based message_11, ID_group-based message_12
    </conversation_primitive>
</storage_group-based message>
```

In embodiments, a group identifier as defined above may be associated with the group-based message.

In embodiments, a group-based communication channel identifier as defined above may be associated with the group-based message.

In embodiments, a sending user identifier as defined above may be associated with the group-based message. In one implementation, the group-based message may be parsed (e.g., using PHP commands) to determine a sending user identifier of the user (i.e., user profile) who sent the group-based message.

In embodiments, topics may be associated with the group-based message or other user interactions. In one implementation, the group-based message contents may be parsed (e.g., using PHP commands) to determine topics discussed in the group-based message. For example, hashtags in the group-based message may indicate topics associated with the group-based message. In another example, the group-based message may be analyzed (e.g., by itself, with other group-based messages in a conversation primitive) or parsed using a machine learning technique, such as topic modeling, to determine topics associated with the group-based message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

SELECT messageResponses
FROM MSM_Message
WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a reimbursement policy document may indicate that the message is associated with the topic "corporate").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based message database). In one implementation, a storage message may be sent from group-based message server 102B to facilitate indexing in the group-based message database. In another implementation, metadata associated with the message may be determined and the message may be indexed in the group-based message database. In one embodiment, the message may be indexed such that a company's or a group's messages are indexed separately (e.g., in a separate index associated with the group and/or company that is not shared with other groups and/or companies). In one implementation, messages may be indexed at a separate distributed database (e.g., to facilitate data isolation for security purposes).

If there are attachments associated with the message, file contents of the associated files may be used to index such files in the group-based message database to facilitate searching. In one embodiment, the files may be indexed such that a company's or a group's files are indexed at a separate distributed database.

Figure 2:
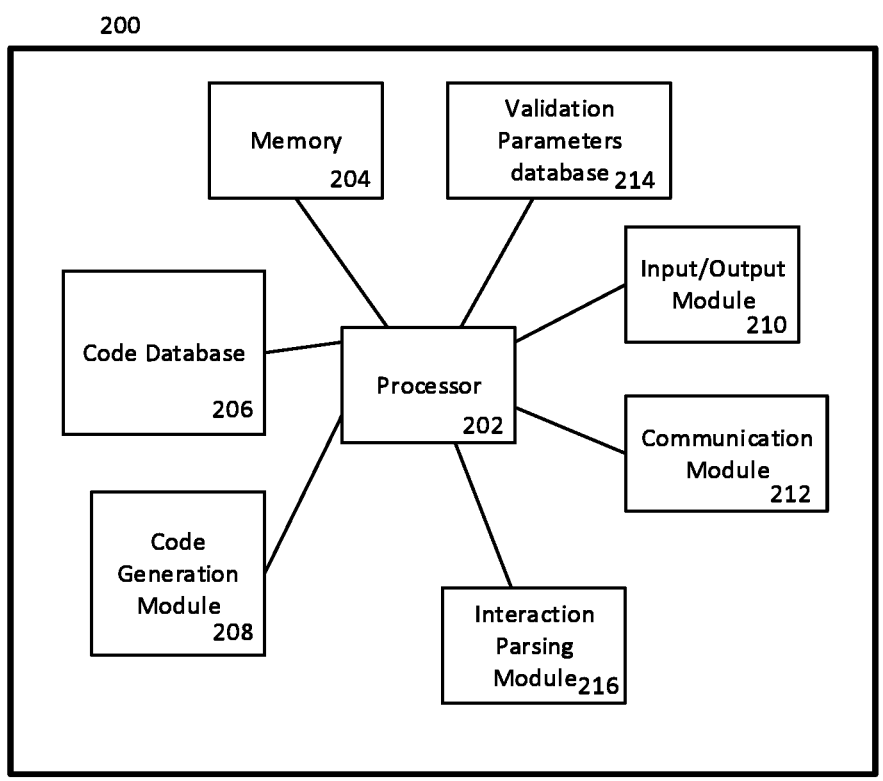
FIG. 2 illustrates a schematic block diagram of circuitry that can be included in a computing device such as a validation server of a messaging and validating system structured in accordance with some embodiments discussed herein.

FIG. 2 shows a schematic block diagram of circuitry 200, which may be included in, for example, validation server 102A or other servers of FIG. 1. Any of the aforementioned systems or devices may be configured to perform, either independently or jointly with other devices connected within network 104. As illustrated in FIG. 2, in accordance with some example embodiments, circuitry 200 includes various means, such as processor 202, memory 204, code database 206, code generation module 208, communication module 212, validation parameters database 214, interaction parsing module 216, and/or input/output module 210. As referred to herein, "module" includes hardware, software and/or firmware configured to perform one or more particular functions. Some or all of the functionality of code database 206, code generation module 208, validation parameters database 214 and interaction parsing module 216 can be performed by processor 202 and the computer instructions to perform these functions may be stored in memory 204. In some embodiments, data in code database 206 and validation parameters database 214 may be stored in memory 204. The circuitry 200 of validation server 102A as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 204) that is executable by a suitably configured processing device (e.g., processor 202), or some combination thereof. In some embodiments, the group-based message server 102B, may provide the following example stored group-based message, substantially in the form of a HTTP (S) POST group-based message including XML-formatted data, as provided below:

embodiments processor 202 comprises a plurality of processors. The plurality of processors may be embodied on a single computing device or may be distributed across a plurality of computing devices collectively configured to function as circuitry of validation server 102A.

The plurality of processors may be in operative communication with each other and may be collectively configured to perform one or more functionalities of circuitry of validation server 102A as described herein. In an example embodiment, processor 202 is configured to execute instructions stored in memory 204 or otherwise accessible to processor 202.

Whether configured by hardware, firmware/software methods, or by a combination thereof, processor 202 may comprise an entity capable of performing operations according to embodiments of the present disclosure while configured accordingly. Thus, for example, when processor 202 is embodied as an ASIC, FPGA or the like, processor 202 may comprise specifically configured hardware for conducting one or more operations described herein. Alternatively, as another example, when processor 202 is embodied as an executor of instructions, such as may be stored in memory 204, the instructions may specifically configure processor 202 to perform one or more algorithms and operations of the validation server or other components of the a messaging and validating system described herein, such as those discussed in connection with FIGS. 3-6.

Memory 204 may comprise, for example, volatile memory, non-volatile memory, or some combination thereof. Although illustrated in FIG. 2 as a single memory, memory 204 may comprise a plurality of memory compo-

```
POST /storage_group-based message.php HTTP/1.1
Host: www.server.com
Content-Type: Application/XML
Content-Length: 667
<?XML version = "1.0" encoding = "UTF-8"?>
<storage_group-based message>
    <group-based message_identifier>ID_group-based message_10</group-based message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>inventions</topic>
        <topic>technical</topic>
        <topic>documents</topic>
    </topics>
    <responses>
        <response>liked by ID_user_2</response>
        <response>starred by ID_user_3</response>
    </responses>
    <contents> Here is page 1 of Acme Doc 12345:</contents>
    <attachments></attachments>
    <conversation_primitive>
        conversation includes group-based messages: ID_group-based message_8, ID_group-based
message_9, ID_group-based message_10,
        ID_group-based message_11, ID_group-based message_12
    </conversation_primitive>
</storage_group-based message>
```

Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some nents. The plurality of memory components may be embodied on a single computing device or distributed across a plurality of computing devices. In various embodiments, memory 204 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 204 may be configured to store information, data (including item data and/or profile data), applications, instructions, or the like for enabling circuitry of validation server 102A to carry out various functions in accordance with example embodiments of the present disclosure. For example, in at least some embodiments, memory 204 is configured to buffer input data for processing by processor 202. Additionally or alternatively, in at least some embodiments, memory 204 is configured to store program instructions for execution by processor 202. Memory 204 may store information in the form of static and/or dynamic information. This stored information may be stored and/or used by circuitry of validation server 102A during the course of performing its functionalities.

In some embodiments, code database 206 may also or instead be included and configured to store a collection of temporary device codes, long lived device codes and e-mail codes that are accessible by validation server 102A to validate a client device or process a request from a client device, for example, a group finding request or a group modification request. One example code database 206 comprises a temporary device code, a long lived device code, an e-mail code, an e-mail address associated with the e-mail code, time stamp data associated with each of the respective codes, identifiers of users associated with each respective code or user profile identifiers associated with the respective codes, user interaction data, and the like.

Code database 206 may also store data used for code hashing, such as a random string of characters. In some embodiments, code database 206 stores elements of a long lived device code that can be hashed to identify a long lived device code instead of storing the long lived device code itself. In some embodiments, code database 206 stores elements of a temporary device code that can be hashed to identify a temporary device code instead of storing the temporary device code itself.

Code revocation engine 102D may be configured to revoke an existing temporary device code and/or a long lived device code. For example, code revocation engine 102D may be configured to update code database 206 in the instance where a request to revoke a client device is received. Code revocation engine 102D revokes a long lived device code by deleting the long lived device code in code database 206 and/or user profile database 102C. Alternatively, code revocation engine 102D revokes a long lived device code by marking/flagging the long lived device code in code database 206 and/or user profile database 102C as invalid. In some embodiments, code revocation engine 102D automatically revokes a long lived device code if information regarding potential security issues are received, for example, information regarding a wide spread security breach that potentially affects a client device. In some embodiments, code revocation engine 102D revokes a temporary device code if validation server 102A detects a separate validating request comprising the user e-mail address or device ID in the original validating request associated with the temporary device code.

Code generation module 208 may be configured to generate a temporary device code, a long lived device code, and an e-mail code. In some embodiments, the temporary device code, the long lived device code, and the e-mail code are generated pseudo randomly using a pseudo random number generator. Alternatively, the temporary device code, the long lived device code, and the e-mail code are generated using other techniques apparent to one of ordinary skill in the art in view of this disclosure. Some or all of the functionality of code generation module 208 may be performed by processor 202.

Input/output module 210 may be in communication with processor 202 to receive an indication of a user interaction and/or to provide an audible, visual, mechanical, or other output to a user. As such, input/output module 210 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry of validation server 102A is embodied as a server or database, aspects of input/output module 210 may be reduced as compared to embodiments where circuitry of validation server 102A is implemented as an end-user machine (e.g., client device) or other type of device designed for other complex user interactions.

Communication module 212 may be embodied as any device or means embodied in circuitry, hardware, a computer program product comprising computer readable program instructions stored on a computer readable medium (e.g., memory 204 or a non-transitory computer readable medium) and executed by a processing device (e.g., processor 202), or a combination thereof that is configured to receive and/or transmit data from/to another device and/or network such as other servers. In some embodiments, communication module 212 (like other components discussed herein) can be at least partially embodied as or otherwise controlled by processor 202. In this regard, communication module 212 may be in communication with processor 202, such as via a bus. Communication module 212 includes, for example, an antenna, a transmitter, a receiver, a transceiver, network interface card and/or supporting hardware and/or firmware/software for enabling communications with another computing device.

Communication module 212 may be configured to receive and/or transmit any data that may be stored by memory 204 using any protocol that may be used for communications between computing devices. Communication module 212 may additionally or alternatively be in communication with the memory 204, input/output module 210 and/or any other component of circuitry of validation server 102A, such as via a bus.

In some embodiments (like other components discussed herein), input/output module 210 may optionally be eliminated from circuitry of validation server 102A. Alternatively, such as in embodiments wherein circuitry of validation server 102A is embodied as a server or database, at least some aspects of input/output module 210 may be embodied on an apparatus (e.g., a client device) used by a user that is in communication with circuitry of validation server 102A. Input/output module 210 may be in communication with the memory 204, communication module 212, and/or any other component(s), such as via a bus. One or more than one input/output module and/or other component can be included in circuitry of validation server 102A.

In some embodiments, validation parameters database 214 is configured to store a set of routines, characteristics, functions, values or algorithms that validation server 102A uses to determine whether a client device 106A-106N should be validated. In some embodiments, client device validation parameters comprises a response time threshold (i.e., a pre-determined time period deemed acceptable between a temporary device code and/or e-mail code transmission time stamp and a confirmation exchange received time stamp), and code identification parameters (set to "Valid" if the previously transmitted temporary device code and e-mail code associated with the temporary device code or an identification of the previously transmitted temporary device code and e-mail code associated with the temporary device code are present in the confirmation exchange). Interaction parsing module 216 may also or instead be included and configured to parse user interaction data to identify a validating request, a group finding request, or a group modification request. In some embodiments, interaction parsing module 216 may be configured to normalize different types of user interaction data received, such as group-based messages, audible, visual, or mechanical user interactions received from various input/output mechanisms of client devices (such as a keyboard, a mouse, a joystick, a display, a touch screen display, a microphone, a speaker, a RFID reader, barcode reader, biometric scanner, and/or other input/output mechanisms).

Client Device Validation and Processing Group Finding/Modifying Request

Figure 3A:
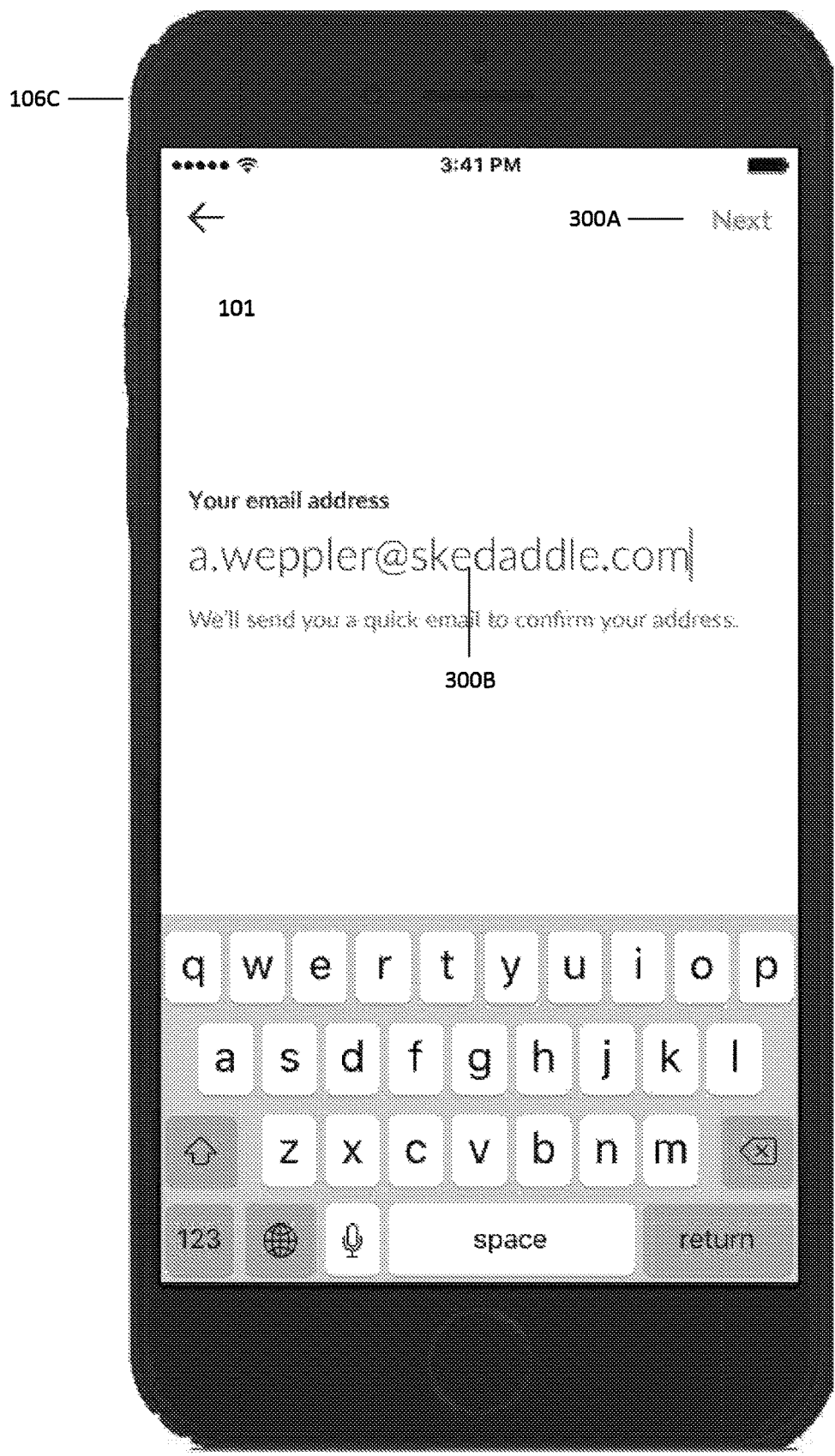
FIGS. 3A-3C illustrate example user interaction prompts associated with a validating request, a group finding request and a group modification request displayed in a group-based communication interface in accordance with some embodiments discussed herein.

FIG. 3A illustrates an example interface displayed on a client device 106C when a group-based communication interface user signs up to use group-based communication system 100 structured in accordance with various embodiments of the disclosure. In one embodiment, the depicted user interface 101 is a start graphical user interface presented immediately after a user downloads, installs, and runs a client device app (e.g., a mobile device software application) associated with the group-based communication system 100. The depicted interface 101 is configured for the purpose of confirming the new user's email address and initiating the process of validating the client device. In another embodiment, the depicted user interface 101 is presented to a group-based communication system user when an existing user initiates the process of validating the client device. When a user uses a client device 106C to sign up to use group-based communication system 100, client device 106C may generate a new user account registration indication and transmit the new user account registration indication to group-based communication system 100. For the purposes described herein, any action performed by client device may be performed by the mobile device software application running on the client device.

As described herein, button 300A and input field 300B are presented on a display of client device 106C. For the purposes described herein, a group-based communication interface user provides an e-mail address by inputting an e-mail address into input field 300B and then pressing "Next" button 300A. After messaging and validating system 102 receives user interaction data generated based on user inputting an e-mail address into input field 300B and pressing button 300A, messaging and validating system 102 will store the e-mail address inputted into input field 300B in user profile database 102C. Further, client device 106C automatically generates and transmits user interaction data comprising a validating request when client device 106C transmits the e-mail address represented in input field 300B and user interaction data indicating button 300A was pressed. In some embodiments, the validating request further comprises device ID of client device 106C.

In some embodiments, messaging and validating system 102 uses validation server 102A to parse the user interaction data transmitted by client device 106C to identify the validating request. In circumstances where validation server 102A identified a validating request, validation server 102A will generate a temporary device code and an e-mail code using code generation module 208 shown in FIG. 2. The temporary device code and e-mail code may be generated pseudo randomly. The generated temporary device code and e-mail code may be stored in code database 206 and/or user profile database 102C. Validation server 102A will transmit the generated temporary device code to client device 106C;

client device 106C will store the temporary device code locally. In some embodiments, the temporary device code expires after a temporary code expiration period. Validation server 102A records time stamp data and store the temporary device code when the temporary device code is transmitted. After the temporary code expiration period has lapsed, validation server 102A deletes the stored temporary device code or marks the stored temporary device code as invalid. Therefore, if data comprising the expired temporary device code is sent back to the messaging and validating system 102 or directly to validation server 102A, validation server 102A will recognize the temporary device code as expired. In some embodiments, validation server 102A stores device ID of client device 106C in user profile database 102C. In some embodiments, the temporary device code is transmitted using a HTTPS protocol.

In some embodiments, if the messaging and validating system 102 receives user interaction data that indicates that the group-based communication interface user pressed button 300A without providing an input corresponding to a valid e-mail address, the messaging and validating system 102 will output an error message to be displayed on the display of client device 106A. For example, the error message comprises the following words when displayed on client device 106A: "You must enter a valid e-mail address".

Figure 3B:
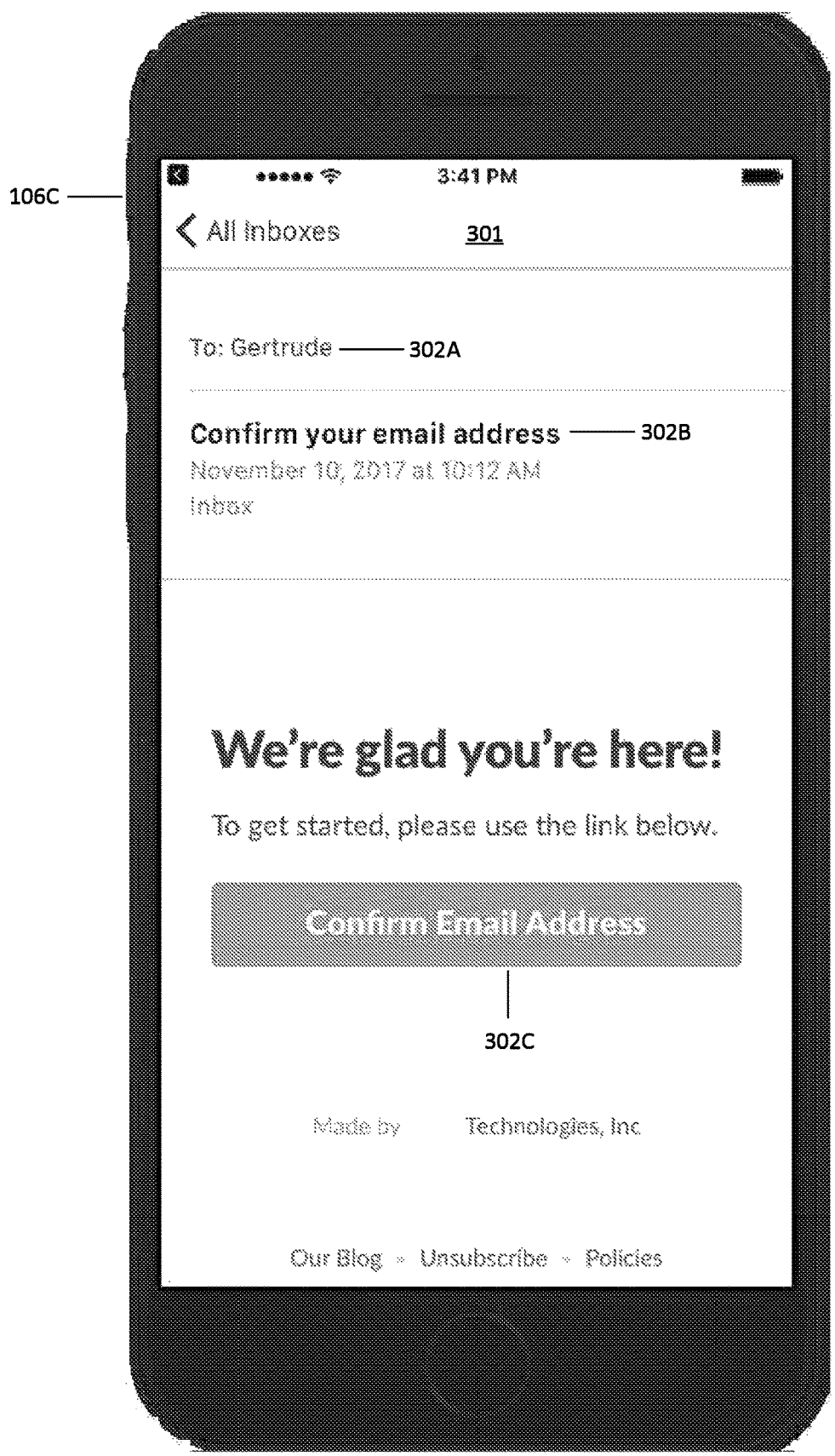

FIG. 3B illustrates an example interface 301 displayed on a client device 106C after the messaging and validating system 102 receives user interaction data that indicates that the user inputted an e-mail address into input field 300B and pressed button 300A, structured in accordance with various embodiments of the disclosure. In one embodiment, the depicted user interface 301 is a graphical user interface presented when the group-based communication interface user accesses an e-mail sent to the user's e-mail address from the messaging and validating system 102. The e-mail address was previously provided by the user in input field 300B and stored in user profile database 102C. The depicted interface 301 is configured for the purpose of providing a protocol to receive user interaction data confirming the new user's email address in the process of validating the client device.

As described herein, user nick name 302A, e-mail subject line 302B, and "Confirm E-mail Address" button 302C are displayed to interface 301. User nick name 302A is generated based on information stored in user profile database 102C, such as a user name. Alternatively or additionally, user nick name 302A can be generated based on information related to the e-mail address of user, such as a user name associated with the e-mail address stored in a server operated by a third party service provider. In some embodiments, E-mail subject line 302B represents subject of the e-mail and can be adjusted based on information stored in user profile database 102C. For example, if information stored in user profile database 102C indicates that the group-based communication interface user has never logged into group-based communication system 100, e-mail subject line 302B is displayed as "Confirm your email address". If information stored in user profile database 102C indicates that the user has already logged into group-based communication system 100, e-mail subject line 302B is displayed as "Confirm your client device".

"Confirm E-mail" button 302C may be embedded with a link that comprises the e-mail code generated and transmitted by validation server 102A. In some embodiments, when the client device detects user interaction data that indicates that the "Confirm E-mail" button 302C was pressed, the client device will send a confirmation exchange comprising the e-mail code embedded and the temporary device code to messaging and validating system 102 and/or directly to validation server 102A. After validation server 102A receives the confirmation exchange, validation server 102A will determine if the confirmation exchange satisfies client device validation parameters by using validation parameters database 214.

Client device validation parameters are a set of routines, characteristics, functions, values, rules, or algorithms that the validation server uses to determine whether a client device should be validated. For example, in the depicted embodiment, client device validation parameters comprise a response time threshold (i.e., a pre-determined time period deemed acceptable between a temporary device code and/or e-mail code transmission time stamp and a confirmation exchange received time stamp), and code identification parameters (set to "Valid" if the previously transmitted temporary device code and e-mail code associated with the temporary device code or an identification of the previously transmitted temporary device code and e-mail code associated with the temporary device code are present in the confirmation exchange).

In circumstances where the confirmation exchange satisfies the client device validation parameters, validation server 102A transmits a long lived device code to the client device and stores the long lived device code under the user profile associated with the group-based communication interface user. Alternatively, validation server 102A may store elements of the long lived device code under the user profile associated with the group-based communication interface user instead of storing the long lived device code itself. In some embodiments, validation server 102A stores the long lived device code to its local memory. The elements of the long lived device code may be hashed to identify the corresponding long lived device code. If a different client device that does not have temporary device code stored locally detects that the user pressed the "Confirm E-mail" button and transmits a confirmation exchange, the validation server will determine that the confirmation exchange transmitted by the different client device does not satisfy client device validation parameters. In some embodiments, the validation server transmits a message comprising "You must use the same device to confirm e-mail!". In some embodiments, the long lived device code is transmitted using a HTTPS protocol.

After client device 106C stores the long lived device code to its local memory, every time the user starts an interaction session with the group-based communication system, the client device may transmit user interaction data comprising a group finding request to validation server. The group finding request may comprise the long lived device code. Validation server 102A will parse the user interaction data upon receipt to identify the group finding request and the long lived device code. After the group finding request and the long lived device code are identified, validation server 102A will transmit information regarding groups associated with the user profile that was retrieved from user profile database 102C. Alternatively, validation server 102A may generate a group summary indicator that comprises group information and transmit the group summary indicator for display by client device.

Figure 3C:
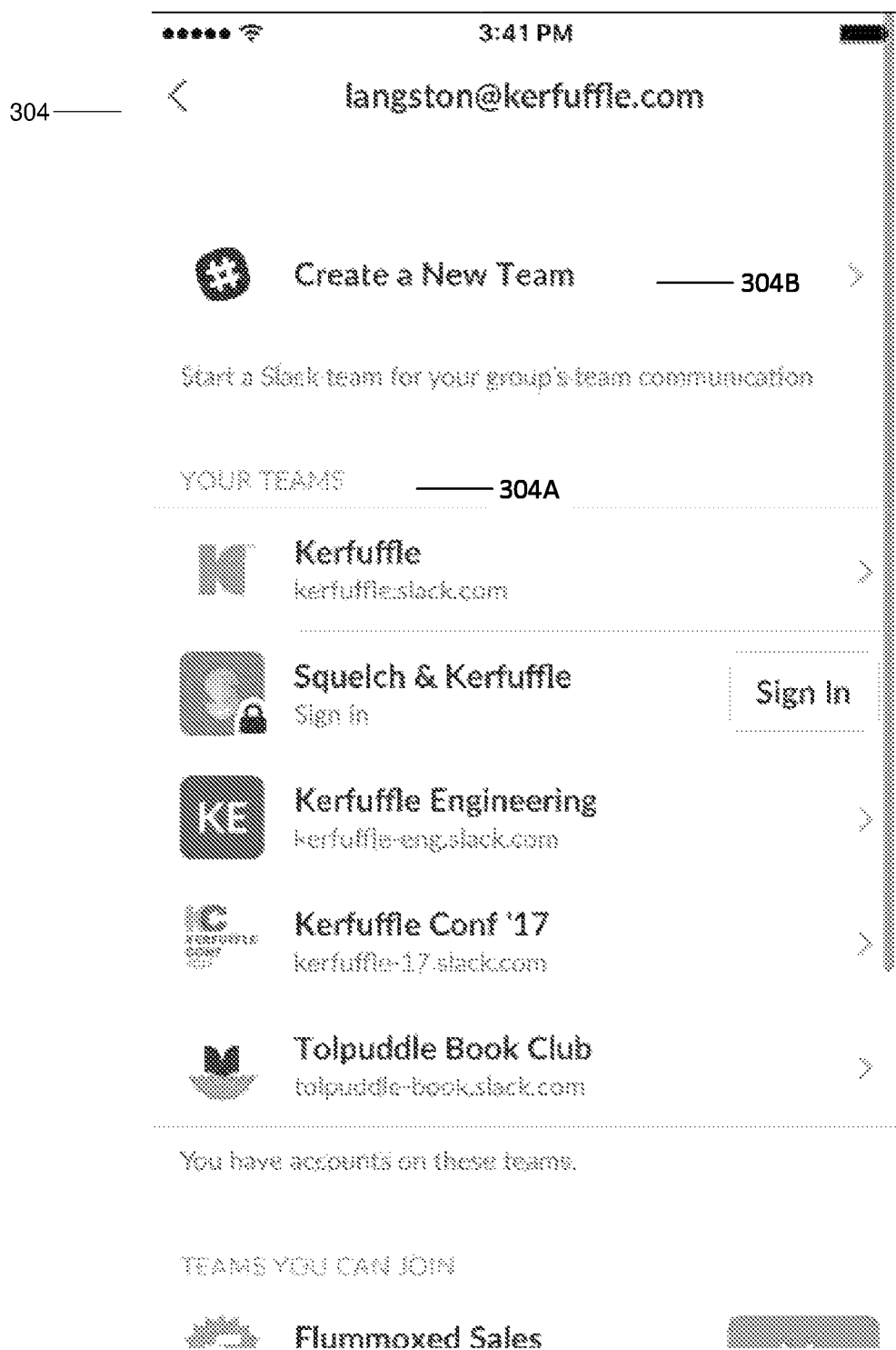

FIG. 3C illustrates an example interface displayed on a client device 106C when a group-based communication interface user starts an interaction session with the group-based communication system after the long lived device code is stored on client device 106C. In one embodiment, the depicted user interface 304 is a group summary graphical user interface presented immediately after a user logs in to use a client device app (e.g., a mobile device software application) associated with the group-based communication system 100. The depicted interface 304 is configured for the purpose of presenting all groups where the user is related to. Further, the depicted user interface 304 provides users a tool to easily modify existing groups and create new groups.

In some embodiments, a validated client device will automatically send a group finding request when the user starts using the group based communication system. Group summary indicator 304A illustrates a title and a list of groups associated with the user profile. Group summary indicator 304A may be generated by client device 106C based on previously transmitted group information from validation server 102A in response to the group finding request. Alternatively, group summary indicator 304A may be generated by validation server 102A as illustrated in the paragraph above.

"Create a New Team" 304B illustrates a button. In some embodiments, if client device 106C detects user interaction data that reflects user interaction with button 304B, client device 106C will automatically start a process of generating a group modification request. Client device 106C transmits the group modification request comprising the long lived device code to messaging and validating system 102 or directly to validation server 102A based on further user interaction data received, for example, name of new team, leader user ID of new team, member of new team, and the like. Once validation server 102A receives the user interaction data from the client device associated, validation server 102A will parse the user interaction data to identify the group modification request and the long lived device code associated with the user profile. If the group modification request and the long lived device code is identified among the user interaction data, validation server 102A will modify group information based on the user interaction data received. Exemplary ways of modifying group information includes, creating a new group with a name, an ID, a URL, and a new set of common access credentials. In another example, modifying group information includes modifying name, ID, URL, or common access credentials. Group information may be modified for the purpose of: removing an existing member, designating a new leader for the group, adding new members to the group, changing the name of the group, changing the URL or the group, and the like. In some embodiments, group modification request is sent by client device 106C with the long lived device code; but the group modification request does not comprise the long lived device code.

In some embodiments, the list of groups in group summary indicator 304A also contain buttons that the user can interact with. In some embodiments, if client device 106C detects user interaction data that reflects user interaction with buttons in group summary indicator 304A, client device 106C will automatically start a process of generating a group modification request. The group modification request may be processed by validation server 102A similar to the process described above. Client device 106C may transmit a group modification request based on further information received, for example, user ID of member to be added, user ID of member to be deleted, new name of the group, and the like. Alternatively, in some embodiments, if client device 106C detects user interaction data that reflects user interaction with buttons in group summary indicator 304A, client device 106C will present a group-based communication interface associated with the group associated with the button.

Figure 4:
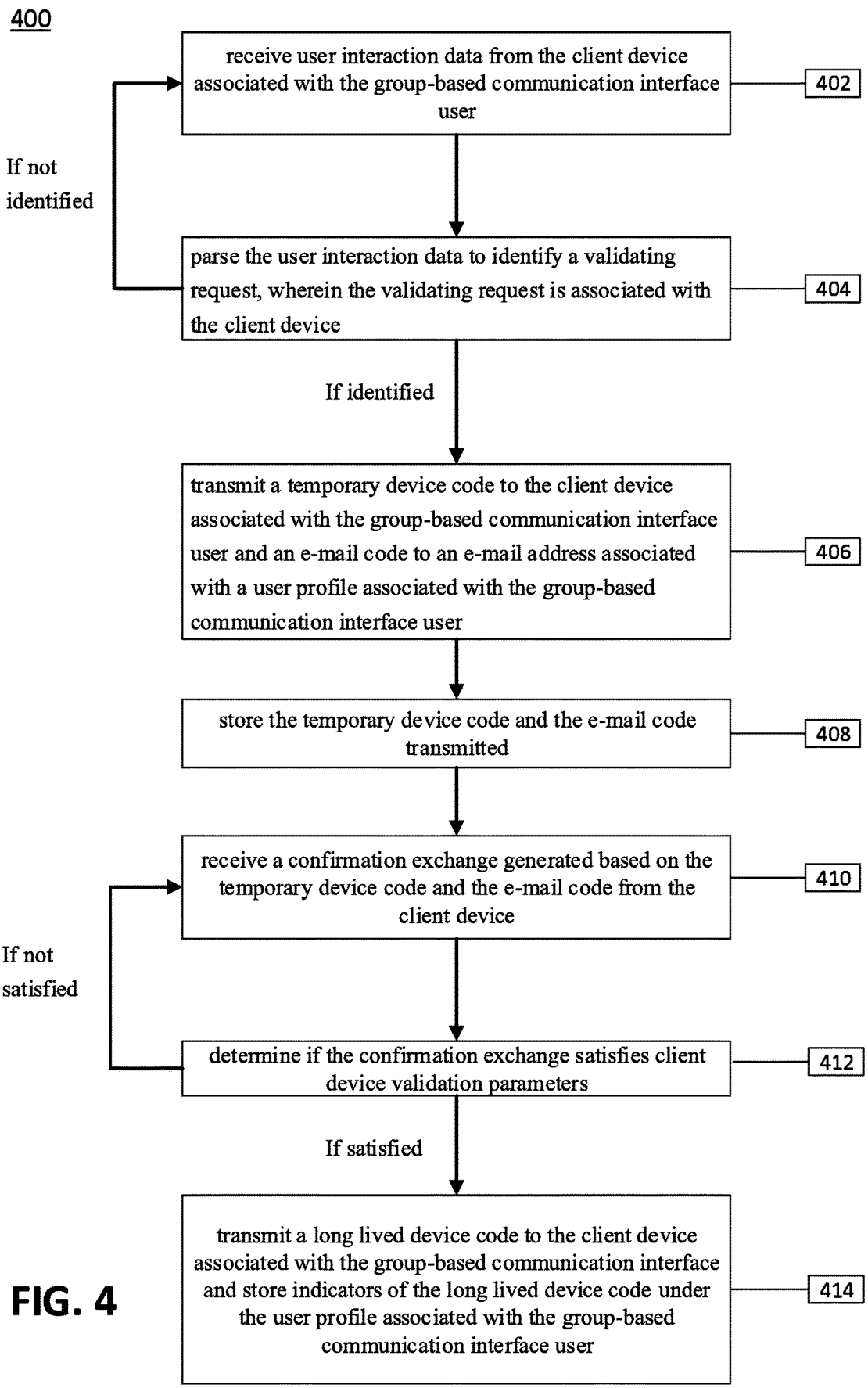
FIG. 4 illustrates a flow diagram detailing an example process for validating a client device in accordance with some embodiments discussed herein.

FIG. 4 illustrates a flow diagram of an example system in accordance with some embodiments discussed herein. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

In particular, FIG. 4 illustrates a method for validating a client device 106C associated with a group-based communication interface user. The depicted method is performed by a messaging and validating system (e.g., item 102 from FIG. 1). In some embodiments, the depicted method may be performed by a validation server (e.g., item 102A of FIG. 1) of a messaging and validating system (e.g., item 102 from FIG. 1). At 402, the example messaging and validating system receives user interaction data from the client device associated with the group-based communication interface user. At 404, the example messaging and validating system parses the user interaction data to identify a validating request, wherein the validating request is associated with the client device. The validating request comprises a device ID of the client device. The example messaging and validating system may recognize the association between the validation request and the client device by identifying the device ID in the validating request. In circumstances where the validating request is identified among the user interaction data, the example system moves to 406 and transmits a temporary device code to the client device associated with the group-based communication interface user and an e-mail code to an e-mail address associated with a user profile associated with the group-based communication interface user. In some embodiments, the example system records time stamp data associated with transmission of the temporary device code and/or time stamp data associated with transmission of the e-mail code.

In circumstances where the validating request is not identified, the example system will go back to 402 and stand-by to receive further user interaction data. Note that the example system may perform another method based on the user interaction data received, such as a method of transmitting a group-based message. At 408, the example system stores the temporary device code and the e-mail code transmitted to memory. Code database 206 may be embedded in the memory which the temporary device code and the e-mail code are stored on.

At 410, the example messaging and validating system receives a confirmation exchange generated based on the temporary device code and the e-mail code from the client device. In some embodiments, confirmation exchanges are generated by a client device and sent to messaging and validating system such as a validation server during the course of validating a client device after receiving the temporary device code from the validation server. The confirmation exchange comprises data generated based on user interaction such as data generated based on embedded e-mail code and data generated based on a temporary device code upon user interaction data generated based on a user pressing a "Confirm E-mail" button as shown in FIG. 3B. In some embodiments, a confirmation exchange is generated by hashing or otherwise combining an e-mail code and a temporary device code. As an example, a confirmation exchange comprising copies of the e-mail code and the temporary code is set forth below:

```
{
    "temp_device_code": "a8b6r7a5c3a0d9abra",
    "email_code": "igotthisfromauniversallinkinanemail"
}
```

At 412, the example system determines if the confirmation exchange satisfies client device validation parameters. Client device validation parameters are a set of routines, characteristics, functions, values, rules, or algorithms that the validation server uses to determine whether a client device should be validated. For example, client device validation parameters may comprise a response time threshold (i.e., a pre-determined time period deemed acceptable between a temporary device code and/or e-mail code transmission time stamp and a confirmation exchange received time stamp), and code identification parameters (set to "Valid" if the previously transmitted temporary device code and e-mail code associated with the temporary device code or an identification of the previously transmitted temporary device code and e-mail code associated with the temporary device code are present in the confirmation exchange).

In circumstances where the confirmation exchange satisfies the client device validation parameters, the example messaging and validating system moves to 414 and transmits a long lived device code to the client device associated with the group-based communication interface user and stores the long lived device code under the user profile associated with the group-based communication interface user. In some embodiments, the example messaging and validating system stores elements of the long lived device code that can be hashed to identify a long lived device code instead of storing the long lived device code itself. In circumstances where the confirmation exchange does not satisfy the client device validation parameters, the example system will go back to 410 and stand-by to receive further confirmation exchanges. Alternatively, the example system may revoke the temporary device code and/or e-mail code transmitted.

Figure 5:
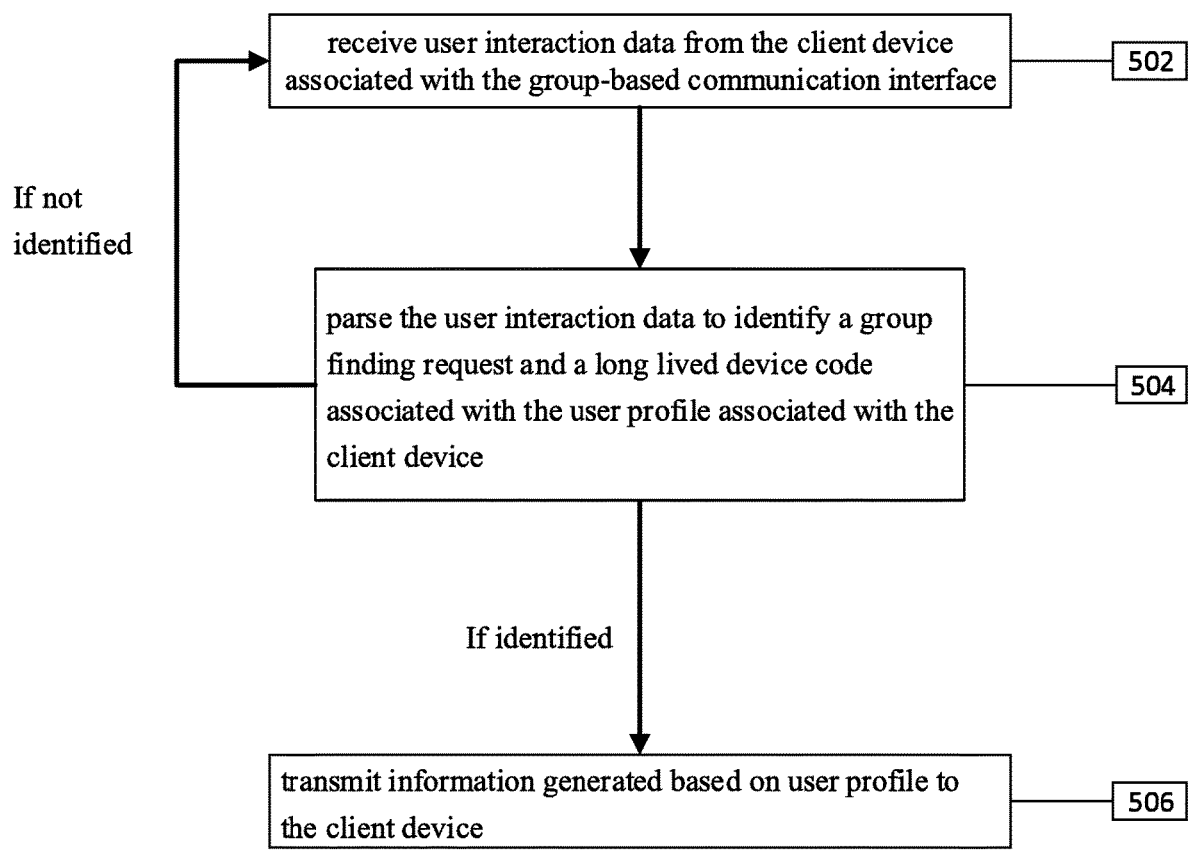
FIG. 5 illustrates a flow diagram detailing an example process for processing a group finding request in accordance with some embodiments discussed herein.

FIG. 5 illustrates a flow diagram of an example system in accordance with some embodiments discussed herein. The depicted method is performed by a messaging and validating system (e.g., item 102 from FIG. 1). In some embodiments, the depicted method may be performed by a validation server (e.g., item 102A of FIG. 1) of a messaging and validating system (e.g., item 102 from FIG. 1). In particular, FIG. 5 illustrates a method for processing a group finding request in accordance with some embodiments discussed herein. At 502, the example system receive user interaction data from the client device associated with the group-based communication interface user. At 504, the example system parses the user interaction data to identify a group finding request and the long lived device code associated with the user profile. In circumstances where the group finding request and the long lived device code is identified among the user interaction data, the example system moves on to 506 and transmits group information associated with the user profile to the client device. In some embodiments, the example system is a messaging and validating system. In circumstances where the group finding request and the long lived device code is not identified among the user interaction data, the example system will go back to 502 and stand-by to receive further user interaction data. Note that the example system may perform another method based on the user interaction data received, such as a method of transmitting a group-based message.

Figure 6:
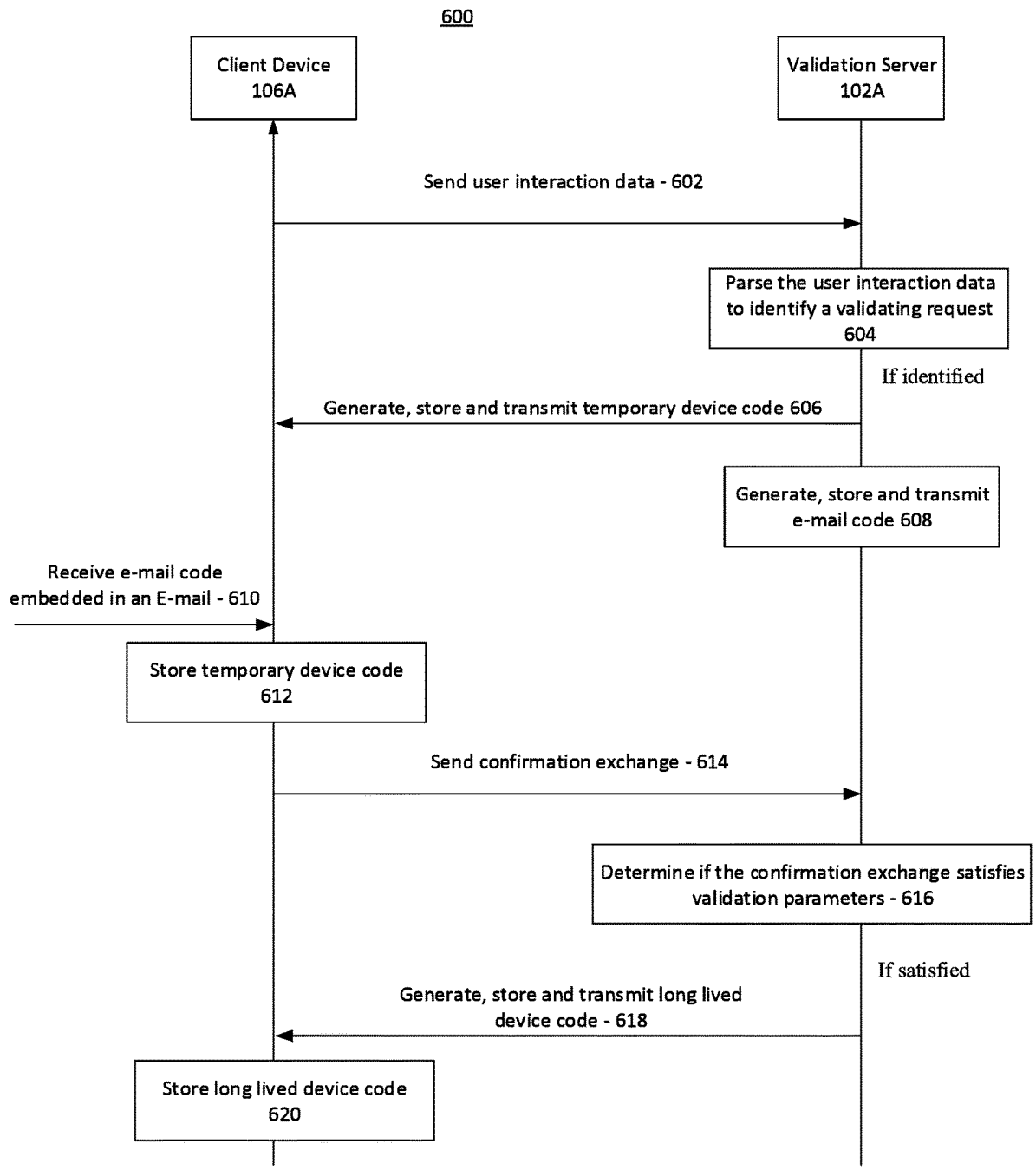
FIG. 6 illustrates a flow chart detailing an example processes for validating request identification, temporary device code transmission, and long lived device code transmission in accordance with some embodiments discussed herein.

FIG. 6 shows a flow chart of an example of a method 600 for validating request identification and temporary device code and the long lived device code transmission processes executed by a validation server 102A in a messaging and validating system 102 and a client device 106C in accordance with one embodiment discussed herein. The depicted method is performed by a messaging and validating system (e.g., item 102 from FIG. 1). In some embodiments, the depicted method may be performed by a validation server (e.g., item 102A of FIG. 1) of a messaging and validating system (e.g., item 102 from FIG. 1).

At 602, client device 106C send user interaction data to validation server 102A. The user interaction data comprises a validating request. The user interaction data is generated based various different user interaction, such as using an e-mail address to sign-up to use a group-based communication system or logging in to use a group-based communication system, as illustrated in FIG. 3A. At 604, after receiving the user interaction from client device 106A, the validation server 102A uses interaction parsing module 216 shown in FIG. 2 to parse the user interaction data to identify a validating request. If validation server 102A identified a validating request, at 606, validation server 102A generate, store and transmit a temporary device code. In circumstances where the validating request is not identified, validation server 102A may stand by to receive further user interaction data. The validation server generates the temporary device code using code generation module 208 shown in FIG. 2. The code generation module may generate the temporary device code pseudo randomly. The temporary device code may be stored in code database 206 and/or memory 204 shown in FIG. 2. The validation server 102A may transmit the temporary device code to client device 106C by using communication module 212. Client device 106C will store the temporary device code locally.

At 608, validation server 102A generate, store and transmit an e-mail code. The e-mail code is generated by code generation module 208 shown in FIG. 2. The e-mail code may be stored in code database 206 and/or memory 204 shown in FIG. 2. The e-mail code is transmitted to an e-mail address stored in user profile database 102C. The service provider of the e-mail address may be a third party service provider, such as an ACME e-mail. Validation server 102A transmits e-mail code by communicating with a server operated by the e-mail service provider, such as an e-mail ACME e-mail service provider. Client device 106C access the e-mail code by accessing an e-mail comprising the e-mail code. Block 606 and 608 can happen sequentially or concurrently, and block 608 may happen before, after, or currently with block 606. Validation server 102A may generate the e-mail code using code generation module 208. The code generation module may generate the e-mail code pseudo randomly. The e-mail code may be stored in code database 206 and/or memory 204. Validation server 102A transmits the e-mail code to an e-mail address associated with the user stored in user profile database 102C. The e-mail code may be embedded in an E-mail without explicit display of the code. For example, the e-mail code may be embedded in an e-mail with a "confirm E-mail" button, as illustrated in FIG. 3B. At 610, the client device receives e-mail code embedded in an E-mail. At 612, client device 106C stores the e-mail code locally. Block 610 and 612 can happen sequentially or concurrently, and block 610 may happen before, after, or currently with block 612.

In some embodiments, the e-mail code expires after an e-mail code expiration period. Validation server 102A may record time stamp data and store the e-mail code when the e-mail code is transmitted. After the e-mail code expiration period has lapsed, the server deletes the stored e-mail code or marks the stored e-mail code as invalid. Therefore, if data comprising the expired temporary device code is sent back to validation server 102A, validation server 102A will recognize the temporary device code as expired. In some embodiments, validation server 102A will store the e-mail code as associated with a temporary device code and validation server 102A will only recognize any e-mail code as valid only if the e-mail code is sent back with temporary device code associated with the e-mail code.

At 614, client device 106C send confirmation exchange to validation server 102A. The confirmation exchange comprises data generated based on user interaction, for example, copying embedded e-mail code and temporary device code after client device 106C detects that user interacts a "Confirm E-mail" button, similar to the process illustrated in FIG. 3B. In some embodiments, the method of generating confirmation exchange is copying an embedded e-mail code and a temporary device code then repackage them into a single confirmation exchange. At 616, validation server 102A determines if the confirmation exchange satisfies client device validation parameters. The client device validation parameters are stored in validation parameters database 214 shown in FIG. 2. The client device validation parameters are a set of routines, characteristics, functions, values, rules, or algorithms that the validation server uses to determine whether a client device should be validated. For example, client device validation parameters may comprise a response time threshold (i.e., a pre-determined time period deemed acceptable between a temporary device code and/or e-mail code transmission time stamp and a confirmation exchange received time stamp), code association data (i.e., data indicating association between a specific temporary device code and a specific e-mail code), and code identification parameters (set to "Valid" if the previously transmitted temporary device code and e-mail code or an identification of the previously transmitted temporary device code and e-mail code are present in the confirmation exchange).

If validation server 102A determines that confirmation exchange received satisfies client device validation parameters, at 618, validation server 102A generate, store and transmit long lived device code to client device 106A. At 620, client device 106C store long lived device for future use, for example, when client device 106C makes group modification or group finding requests, as illustrated in FIG. 3C.

The invention claimed is:

1. A method comprising:
    receiving user interaction data from a client device associated with a group-based communication platform;
    identifying, based at least in part on the user interaction data, a first request associated with the client device of a user, wherein the first request comprises a validation request;
    transmitting, to the client device, a first code that is valid for a first period of time;
    transmitting, to the client device, a second code to confirm an identity of the user;
    receiving, from the client device and based at least in part on the first code and the second code, a second request to determine whether the client device satisfies a validation parameter; and
    in response to a determination that the client device satisfies the validation parameter, causing a third code, that is valid for a second period of time, to be stored on the client device to validate the client device for presenting a group-based communication interface via the group-based communication platform, wherein the second period of time is longer than the first period of time.

2. The method of claim 1, wherein the first request comprises a device ID of the client device.

3. The method of claim 1, further comprising:
    receiving time stamp data associated with transmission of the first code; and
    determining, based at least in part on a determination that a difference between the time stamp data and a system time is within the first period of time, that the client device satisfies the validation parameter.

4. The method of claim 1, wherein the second code comprises an embedded link or a random code.

5. The method of claim 1, wherein the user interaction data comprises first user interaction data, the method further comprising:
    receiving second user interaction data from the client device;
    identifying, from the second user interaction data, a third request to access group information related to a group associated with a user profile;
    identifying, from the second user interaction data, the third code; and
    transmitting, based at least in part on identifying the third request and the third code, the group information associated with the user profile.

6. The method of claim 1, wherein the user interaction data comprises first user interaction data and further comprising:
    receiving second user interaction data from the client device;
    identifying, from the second user interaction data, a third request to modify group information associated with a user profile and the third code; and
    modifying, based at least in part on identifying the third request and the third code, the group information associated with the user profile.

7. The method of claim 1, wherein the second code is valid for a third period of time, the method further comprising:
    receiving time stamp data associated with transmission of one of the first code or the second code; and
    determining, based at least in part on a determination that a difference in time between the time stamp data and a system time is not within the first period of time or the third period of time, that the client device does not satisfy the validation parameter.

8. The method of claim 1, wherein the user interaction data comprises first user interaction data, the method further comprising:
    receiving second user interaction data from the client device;
    identifying, from the second user interaction data, a third request to access information associated with at least one group associated with a user profile and the third code; and
    generating, based at least in part on identifying the third request and the third code, an indicator that includes group information for display by the client device.

9. A system comprising:
    one or more processors;
    one or more non-transitory computer-readable media storing instructions executable by the one or more processors, wherein the instructions program the one or more processors to perform acts comprising:
        receiving user interaction data from a client device associated with a group-based communication platform;
        identifying, based at least in part on the user interaction data, a first request associated with the client device of a user, wherein the first request comprises a validation request;
        transmitting, to the client device, a first code that is valid for a first period of time;
        transmitting, to the client device, a second code to validate an identity of the user;
        receiving, from the client device and based at least in part on the first code and the second code, a second request to determine whether the client device satisfies a validation parameter;
        in response to a determination that the client device satisfies the validation parameter, causing a third code, that is valid for a second period of time, to be stored on the client device to validate the client device for presenting a group-based communication interface via the group-based communication platform, wherein the second period of time is longer than the first period of time.

10. The system of claim 9, wherein the first request comprises a device ID of the client device.

11. The system of claim 9, wherein the second code comprises an embedded link or a random code.

12. The system of claim 9, further comprising:
    receiving time stamp data associated with transmission of the first code; and
    determining, based at least in part on a determination that a difference between the time stamp data and a system time is within the first period of time, that the client device satisfies the validation parameter.

13. The system of claim 9, wherein the user interaction data comprises first user interaction data, and wherein the acts further comprise:
    receiving second user interaction data from the client device;
    identifying, from the second user interaction data, a third request to access information associated with at least one group associated with a user profile and the third code; and generating, based at least in part on identifying the third request and the third code, an indicator that includes group information for display by the client device.

14. The system of claim 9, wherein the user interaction data comprises first user interaction data, and wherein the acts further comprise:
receiving second user interaction data from the client device;
identifying, from the second user interaction data, a third request to access group information related to a group associated with a user profile;
identifying, from the second user interaction data, the third code; and
transmitting, based at least in part on identifying the third request and the third code, the group information associated with the user profile.

15. The system of claim 9, wherein the second code is valid for a third period of time, and wherein the acts further comprise:
receiving time stamp data associated with transmission of one of the first code or the second code;
determining, based at least in part on a determination that a difference in time between the time stamp data and a system time is not within the first period of time or the third period of time, that the client device does not satisfy the validation parameter.

16. The system of claim 9, wherein the user interaction data comprises first user interaction data, and wherein the acts further comprise:
receiving second user interaction data from the client device;
identifying, from the second user interaction data, a third request to modify group information associated with a user profile and the third code; and
modifying, based at least in part on identifying the third request and the third code, the group information associated with the user profile of the group-based communication interface.

17. One or more non-transitory computer-readable media storing computer-executable instructions that, when executed by one or more processors, cause the one or more processors to perform acts comprising:
receiving user interaction data from a client device associated with a group-based communication platform;
identifying, based at least in part on the user interaction data, a first request associated with the client device of a user, wherein the first request comprises a validation request;
transmitting, to the client device, a first code that is valid for a first period of time;
transmitting, to the client device, a second code to confirm an identity of the user;
receiving, from the client device and based at least in part on the first code and the second code, a second request to determine whether the client device satisfies a validation parameter; and
in response to a determination that the client device satisfies the validation parameter, causing a third code, that is valid for a second period of time, to be stored on the client device to validate the client device for presenting a group-based communication interface via the group-based communication platform, wherein the second period of time is longer than the first period of time.

18. The one or more non-transitory computer-readable media of claim 17, wherein the user interaction data comprises first user interaction data, the acts further comprising:
receiving second user interaction data from the client device;
identifying, from the second user interaction data, a third request to access information associated with at least one group associated with a user profile and the third code; and
generating, based at least in part on identifying the third request and the third code, an indicator that includes group information for display by the client device.

19. The one or more non-transitory computer-readable media of claim 17, wherein the user interaction data comprises first user interaction data, the acts further comprising:
receiving second user interaction data from the client device;
identifying, from the second user interaction data, a third request to access group information related to a group associated with a user profile;
identifying, from the second user interaction data, the third code; and
transmitting, based at least in part on identifying the third request and the third code, the group information associated with the user profile.

20. The one or more non-transitory computer-readable media of claim 17, wherein the user interaction data comprises first user interaction data, the acts further comprising:
receiving second user interaction data from the client device;
identifying, from the second user interaction data, a third request to modify group information associated with a user profile and the third code; and
modifying, based at least in part on identifying the third request and the third code, the group information associated with the user profile of the group-based communication interface.

* * * * *